United States Patent Office 2,711,363
Patented June 21, 1955

2,711,363

BLEACHING AND DISINFECTING AGENTS

Wilhelm Waibel, Frankfurt (Main), Germany, assignor to Farbwerke Hoechst Aktiengesellschaft vormals Meister Lucius & Bruning, Frankfurt am Main, Hochst, Germany, a company of Germany No Drawing. Application March 9, 1954,
Serial No. 415,175

Claims priority, application Germany December 27, 1949

3 Claims. (Cl. 23—85)

The present invention relates to bleaching and disinfecting agents. This application is a continuation-in-part of application Serial No. 200,493 filed December 12, 1950, and now U. S. Patent No. 2,691,637. In said latter application a method is employed, which consists in adding to the bleaching baths an acid of the nitrogen oxides, preferably of nitric acid and/or the salts thereof when working with aqueous chlorite solution, corrosion in apparatus which consist wholly or partly of stainless steel being thus avoided. As a rule, about 0.6 to 1 mol of nitrates per 1 mol of chlorite is added to the baths.

The chlorite solutions are prepared by starting from solid alkali metal chlorites or chlorites of alkaline earth metals which, as is known, are readily liable to explosion, especially in the presence of organic substances and sulfur and may thus be the cause of dangerous fire. On adding the required quantity of nitrates there exists the risk of an inaccurate dosage which in case the quantity added is too small may give rise to considerable damages on the apparatus.

Now, I have found that a stable bleaching agent is obtained by mixing a chlorite and a nitrate. In this way it is possible from the very beginning to produce a mixture containing such a proportion of the ingredients that when required for application it need only be introduced into water to yield solutions ready for use and containing a sufficient quantity of the anti-corrosive.

It ought to have been taken into account that mixtures essentially containing chlorites and nitrates would be still more dangerous than chlorites alone. Contrary to theoretical expectations, the mixtures of the present invention possess, however, a considerably improved thermal stability and a reduced tendency to explosion. The mixtures are very stable against the action of heat. Whereas commercial sodium chlorite which, as a rule, contains about 80 per cent. of pure chlorite, decomposes briskly at about 150° C. with rise of temperature, and in the presence of an organic substance reacts at about 165° C. in the way of an explosion, mixtures of sodium chlorite and sodium nitrate may be heated to far higher temperatures without decomposition taking place. Only at above 300° C. the mixtures begin to melt with slow formation of chloride. Even if an organic substance is present in the mixture, the risk of decomposition is essentially reduced. At temperatures above about 210 C. reaction sets in without inflammation. Even in the presence of sulfur inflammation does not occur; such an inflammation, however, cannot be avoided when the commercial sodium chlorite is used.

It is, of course, possible to prepare mixtures of chlorites and nitrates in any proportion desired, even with a very low content of nitrate. The advantages described above set in with certainty if the mixture is composed of at least 0.3 mol of nitrate per 1 mol of chlorite. Corrosions of apparatus made of stainless steel can with certainty be avoided by using, for bleaching, a mixture which contains 0.4 mol, preferably 0.6 mol of nitrate per 1 mol of chlorite. The addition of nitrates is not subjected to an upper limit. For merely practical reasons it is, however, not necessary to use more than 1 mol of nitrate per 1 mol of chlorite.

The mixtures of the present invention may be prepared by using alkali metal chlorites or chlorites of alkaline earth metals, for instance sodium, potassium and calcium chlorite. As nitrates there come into consideration alkali metal nitrates or nitrates of alkaline earth metals. As examples there may be named sodium nitrate, ammonium nitrate, potassium nitrate or calcium nitrate. When preparing the mixtures of the present invention it is not necessary to mix the chlorites and nitrates with the same cation. On the contrary, the cations of the two components may be different. It is also possible to mix the chlorites with mixtures of nitrates and/or mixtures of different chlorites with exactly defined nitrates or with mixtures of several nitrates.

Solid salt mixtures according to the present invention may be obtained, for instance, by intimately mixing the solid salts, it being advantageous to use salts of the same size of grain, so as to avoid a possible disintegration later on.

It is, however, not absolutely necessary to prepare the mixtures by mixing the solid salts. The salt mixtures may also be obtained by evaporating or spraying the solutions containing the salts in the ratio named above.

The present invention, therefore, relates to mixtures of bleaching agents containing alkali metal chlorites or chlorites of alkaline earth metals and alkali metal nitrates or nitrates of alkaline earth metals, inclusive of ammonium nitrates, as active constituents. The mixture may, of course, contain further products, for example inorganic or organic salts which may act as buffer substances. The present invention, therefore, relates to mixtures of bleaching agents essentially containing chlorites and nitrates.

The solid mixtures according to this invention may be used for bleaching purposes and in the prepartion of chlorine dioxide from chlorites, for example for disinfection and oxidation purposes. Other auxiliary agents usually applied in combination with chlorites may be added to the solid mixtures or concentrated solutions or also, according to the nature of the auxiliary agents, to the solutions ready for use.

The following examples serve to illustrate the invention, but they are not intended to limit it thereto:

Example 1

295 grams of potassium chlorite of 90 per cent. strength are intimately mixed with 213 grams of sodium nitrate and the mixture is ground to an equal size of grain. It is also possible to grind each compound as such before the mixing, to an equal size of grain and to mix the ground products after the grinding operation. Instead of the quantity named of sodium nitrate there may be used the equivalent portion of potassium nitrate or a mixture of sodium nitrate and potassium nitrate.

Example 2

290 kilograms of commercial sodium chlorite of 86.2 per cent. strength and 210 kilograms of sodium nitrate are dissolved in 1000 liters of water and the solution so obtained is evaporated by spraying. The solid white powder obtained contains 50 per cent. of sodium chlorite and 42 per cent. of sodium nitrate. The rest consists of about 1.6 per cent. of sodium carbonate, 1.8 per cent. of sodium chlorate and about 4.6 per cent. of sodium chloride which were contained as auxiliary substances in the commercial sodium chlorite.

Instead of the quantity of sodium chlorite named above there may be used the corresponding portion of a mixture of calcium chlorite and sodium chlorite.

Example 3

330 grams per liter of calcium nitrate are added to a solution of 350 grams per liter of calcium chlorite containing as auxiliary substances of the calcium chlorite about 1 gram per liter of calcium hydroxide, about 1.6 grams per liter of calcium chloride and 0.7 gram per liter of calcium chlorate. A stable concentrated solution is obtained.

The solution so obtained can be worked up to a solid, fine powder by evaporation and grinding the solid product formed or by spray-drying.

Instead of the quantity named of calcium nitrate there may be added the equivalent quantity of sodium or potassium nitrate.

Example 4

145 grams per liter of ammonium nitrate are added to a solution of 226 grams per liter of sodium chlorite containing as auxiliary substances about 7 grams per liter of sodium carbonate, about 1.5 grams per liter of sodium chlorite and about 0.4 gram per liter of sodium chlorate. The solution thus formed is extremely stable. It may be transformed by spray-drying into a solid powder.

I claim:

1. A stable composition consisting essentially of a substantial proportion of a water soluble chlorite selected from the group consisting of the alkali metal chlorites and alkaline earth metal chlorites, and a nitrate selected from the group consisting of the alkali metal nitrates, the alkaline earth metal nitrates and ammonium nitrate, the nitrate being present in an amount of at least 0.4 mol for each mol of the water soluble chlorite.

2. A stable composition consisting essentially of a substantial proportion of an alkali metal chlorite and an alkali metal nitrate, the latter being present in an amount of at least 0.4 mol for each mol of the alkali metal chlorite.

3. A stable composition consisting essentially of a substantial proportion of sodium chlorite and sodium nitrate, wherein about 0.6 to about 1 mol of the sodium nitrate is present for each mol of the sodium chlorite.

References Cited in the file of this patent

UNITED STATES PATENTS

| | | |
|---|---|---|
| 2,071,091 | Taylor | Feb. 16, 1937 |
| 2,482,891 | Aston | Sept. 27, 1949 |
| 2,526,839 | Aston | Oct. 24, 1950 |